United States Patent Office 2,782,573
Patented Feb. 26, 1957

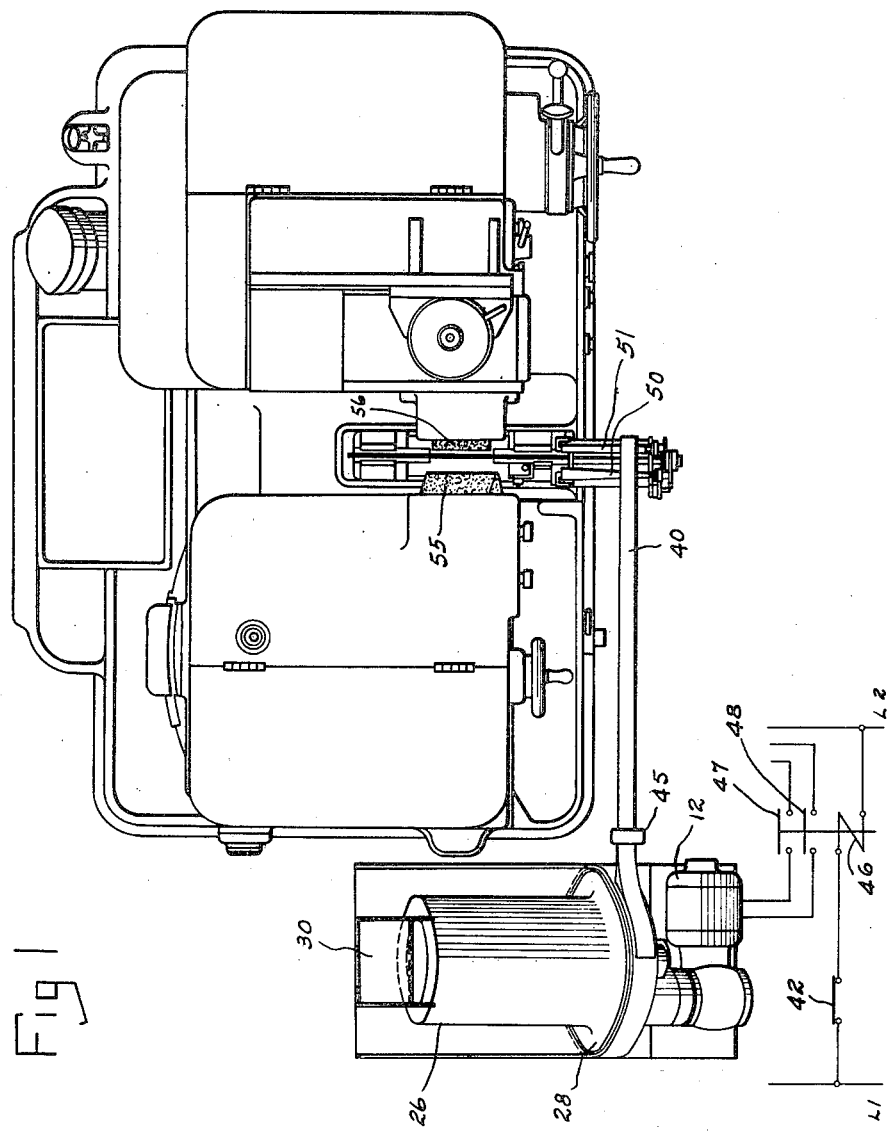

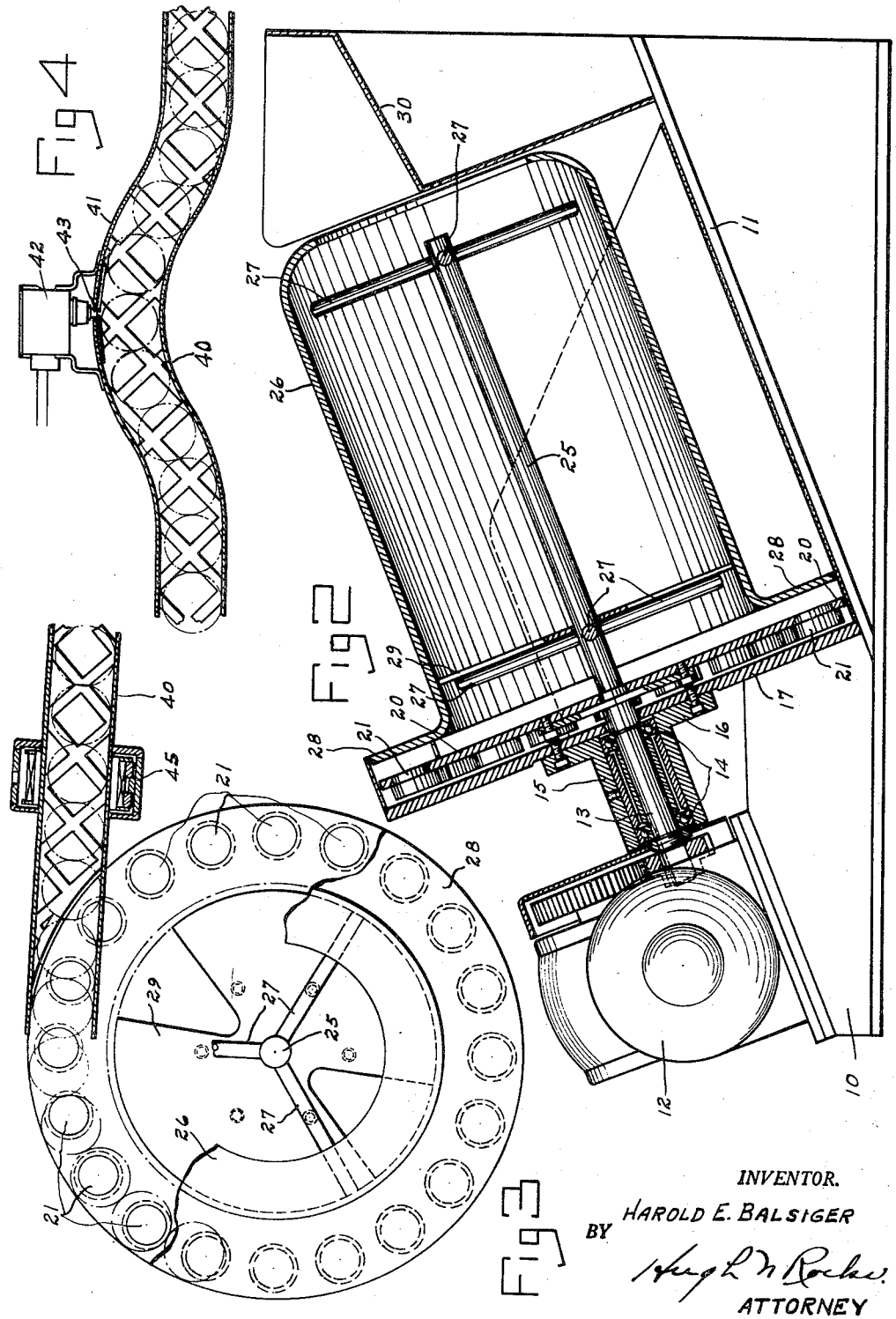

2,782,573

WORK FEEDING DEVICE

Harold E. Balsiger, Waynesboro, Pa., assignor to Landis Tool Company, Waynesboro, Pa.

Application November 13, 1952, Serial No. 320,296

7 Claims. (Cl. 51—215)

This invention relates to apparatus for supplying work pieces automatically to the point of operation in a machine tool.

In this case the machine tool is a centerless grinding machine and the work pieces are rings or discs which are to be ground on their external peripheral surfaces.

The only apparatus available at present for feeding such work pieces into a centerless grinder at the same rate as the pieces are ground is of the type shown in Bossi Patent 2,564,016, granted August 21, 1951. Apparatus of this type works satisfactorily so far as conducting the work pieces to the point of operation is concerned. However, an operator must be present all the time to keep the work feeding device supplied with unground work pieces.

It is therefore an object of this invention to provide an apparatus whereby large quantities of work pieces may be placed in a hopper and conducted from said hopper in predetermined order and arrangement to the feeding mechanism in the grinding machine.

A further object is to provide means for removing the work piece from a promiscuous pile of work pieces in the hopper and arranging them in a predetermined order preparatory to being conducted to the feeding mechanism.

A further object is to provide means for stopping the rotation of the hopper if the flow of work pieces to the feeding mechanism is obstructed.

A further object is to provide means for automatically regulating the flow of work pieces to that required by the receiving machine.

Figure 1 is a plan view of a centerless grinder showing the relation of the invention thereto.

Figure 2 is an enlarged sectional view of the hopper and the means for removing work pieces therefrom.

Figure 3 is an end view showing how work pieces are removed from the bottom of the hopper into the chute which carries them to the feeding mechanism.

Figure 4 is a sectional elevation of part of the chute showing the means for stopping the operation of the apparatus when the flow of work pieces is obstructed or to regulate the flow of work pieces.

The hopper includes a base member 10 having a portion 11 thereof inclined at an angle at one end of said platform and also at an inclined position is a motor and speed change combination 12. The output shaft 13 of said speed change is rotatably supported on anti-friction bearing 14 in a sleeve 15 having a flanged portion 16 to which is secured a plate 17 forming the bottom of a hopper. Beyond said base member there is secured to shaft 13 a disc 20 having a plurality of permanent magnets 21 distributed around the outer edge thereof and spaced by at least the diameter of the piece to be handled. A further extension 25 of shaft 13 supports a hollow cylindrical member 26 by axially spaced radial spokes 27. A metal disk 29 attached to said spokes and having openings varying in size with the diameter of the work piece serves to regulate the movement of said pieces toward disc 20. Member 26 is flanged outwardly at the end adjacent disc 20 to a diameter substantially equal to that of said disc. The space between this flanged portion 28 and disc 20 is slightly greater than the thickness of the work piece to be ground. This space may be varied for a work piece of different thickness by adjusting member 26 in an axial direction. The end of said cylindrical member opposite the flange end is curved inwardly toward the center thereof to provide an opening somewhat smaller than the inside diameter of said cylindrical member. Adjacent said opening is a receptacle 30 into which unground work pieces may be deposited and from which they may slide by gravity into member 26. The reason for mounting this device on an inclined axis is to make use of gravity as much as possible. That is, through the rotation of member 26 the work pieces therein will be kept in motion and because of the inclined position of said member, said work piece will move downwardly toward disc 20. Rotation of member 26 will cause work pieces therein to move toward disk 20 and thru the space between said disk and flange 28 by gravity to the outer edge of said disk where they will be attracted and held thereon by magnets 21.

The means for removing work pieces from disc 20 consists of a chute 40 of rectangular cross section, the inner dimensions of which are slightly greater than the thickness and diameter of the work piece. A portion of said chute overlaps disc 20 directly in the path of the work pieces so that instead of continuing with said disc, they are directed into said chute. The motion of the work pieces on disc 20 serves to urge the work pieces through said chute. The relative position of the hopper and feeding mechanism is such that the chute extends laterally and downwardly. The degree of inclination is such that the work will pass through by gravity when the disk has emptied the hopper. Just beyond the entrance of said chute is the demagnetizing coil 45 which removes any trace of magnetism in the work pieces. Said chute 40 has a bent portion 41 through which work pieces must pass before reaching the feeding mechanism. On the outside of this bent portion is mounted a limit switch 42, the actuating member 43 of which extends through said chute into the path of said work pieces. If the flow of work pieces is obstructed beyond this point, or if they are being delivered faster than the feeding mechanism can take them, the work piece at the center of the curved portion will be forced outwardly against switch actuating member 43 because of the force by which the work pieces on disc 20 urge those in chute 40 to move through said chute. Switch 42, when so actuated, completes a circuit to relay 46 opening contacts 47 and 48 and stopping motor 12 until said obstruction has been removed. Upon removal of such an obstruction, the work piece in the center of the bent portion is released and drops back to its normal position permitting switch 42 to open the energizing relay 46 and closing contacts 47 and 48 so that motor 12 may start again and continue the supply of work pieces to chute 40. At the other end of said chute the work pieces are discharged in any suitable manner to the said mechanism which for the purpose of illustration consists of motor driven rollers 50 and 51 which rotate the work piece and also urge it axially toward the grinding throat formed by grinding wheel 55 and control wheel 56. This mechanism is disclosed more in detail in the above mentioned Bossi patent.

I claim:

1. Means for feeding work pieces into a machine comprising a loading mechanism, means for driving said loading mechanism, means for supplying work pieces to said loading mechanism comprising a hopper, a rotatable disc in said hopper having means thereon for removing work pieces from said hopper, means for rotating said disc including a motor, a chute connecting said hopper and said loading mechanism, said rotatable disc serving to transfer said work pieces from said hopper to said chute, and means including a switch in said chute for stopping said motor and means whereby said workpieces buckle and actuate said switch when the flow of said workpieces is obstructed and for starting said motor again after the obstruction is removed.

2. Means for feeding work pieces into a machine comprising a pair of spaced rollers angularly related so as to cause said work pieces to move axially thereon, means for rotating said rollers, means for supplying work pieces to said rollers comprising a hopper rotatable about an inclined axis, a rotatable disc in said hopper and having means thereon for removing work pieces from said hopper, means for rotating said disc including a motor, a chute connecting said hopper and said rollers, said rotating means serving to transfer said work pieces from said hopper to said chute, and means including a curved portion in said chute, a switch in the circuit of said motor and attached to said chute and having its operating member extend through the wall of said chute into the path of the work pieces, whereby when the movement of said work pieces is obstructed at a point beyond said curved portion one of the work pieces in said curved portion will be forced against said switch by pressure of other work pieces being fed into said chute, to stop said motor.

3. Means for supplying work pieces of a predetermined thickness to a feeding mechanism for a machine tool comprising a rotatable hopper, a disk rotatable with said hopper and having magnets inserted therein, a baffle member in said hopper and rotatable therewith and having openings therein for regulating the flow of work pieces to said disk, an external flange on said hopper axially spaced from said disk by an amount slightly greater than the thickness of the work piece to be ground.

4. Means for supplying work pieces to a feeding mechanism for a machine tool comprising a hopper and means for rotating same, a disk rotatable with said hopper and having magnets inserted therein for removing work pieces from said hopper, a baffle in said hopper having an opening for regulating the flow of work pieces to said disk, a chute connecting said hopper and feeding means, said chute having one end adjacent said disk whereby to receive work pieces therefrom.

5. Means for supplying workpieces to a feeding mechanism for a machine tool comprising a hopper and means for rotating same, a disk rotatable with said hopper and having magnets inserted therein for removing workpieces from said hopper, a baffle in said hopper having an opening for regulating the flow of workpieces to said disk, a chute connecting said hopper and feeding means, said chute having one end adjacent said disk whereby to receive workpieces therefrom.

6. Means for supplying workpieces for a machine tool comprising a hopper and means for rotating same, a disk rotatable with said hopper and having magnets inserted therein for removing workpieces from said hopper, a baffle in said hopper having an opening for regulating the flow of workpieces to said disk, a chute connecting said hopper and said machine, said chute having one end adjacent said disk whereby to receive workpieces therefrom.

7. Work feeding means for a machine tool comprising a hopper, means in said hopper for removing workpieces therefrom, a motor for driving said work removing means, a chute connecting said hopper and said machine, said work removing means serving to transfer workpieces from said hopper to said chute and means in said chute including a hump portion and a switch whereby obstruction of flow of workpieces beyond said hump will cause one of said workpieces in said hump to move out of line and against said switch to stop said motor, said switch serving to start said motor again after said workpieces are free to move.

References Cited in the file of this patent

UNITED STATES PATENTS

| Re. 9,229 | Fritz | June 1, 1880 |
|---|---|---|
| 611,302 | Weiss | Sept. 27, 1898 |
| 626,700 | Heinemann | June 13, 1899 |
| 896,573 | Pyper | Aug. 18, 1908 |
| 962,030 | Kirkegaard | June 21, 1910 |
| 1,358,725 | Gaynor | Nov. 16, 1920 |
| 1,476,222 | Salfisberg | Dec. 4, 1923 |
| 1,548,563 | Spencer | Aug. 4, 1925 |
| 1,798,629 | Raymond | Mar. 31, 1931 |
| 1,850,373 | Booth | Mar. 22, 1932 |
| 2,053,763 | Brinton | Sept. 8, 1936 |
| 2,205,087 | Double | June 18, 1940 |
| 2,303,226 | Olson | Nov. 24, 1942 |
| 2,518,375 | Richards | Aug. 8, 1950 |
| 2,613,374 | Gora | Oct. 14, 1952 |
| 2,636,320 | Knight | Apr. 28, 1953 |
| 2,640,302 | Indge | June 2, 1953 |